Patented Oct. 24, 1922.

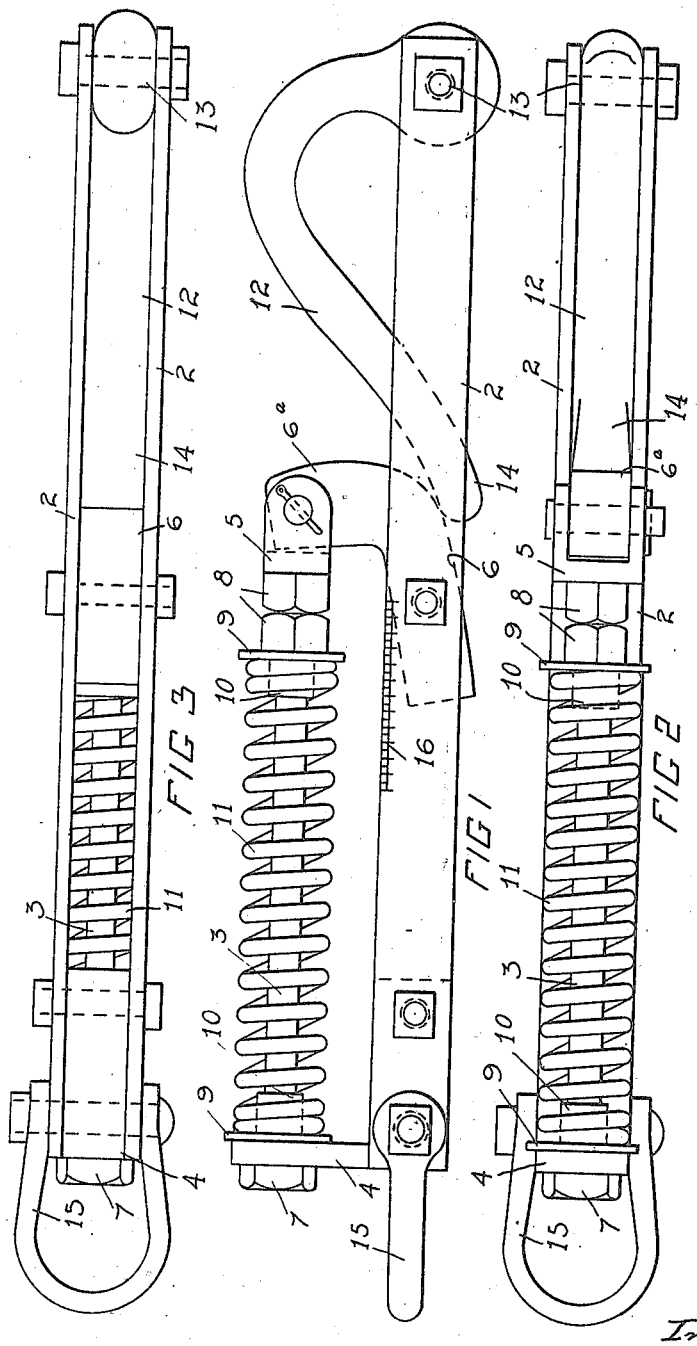

1,433,225

UNITED STATES PATENT OFFICE.

WILLIAM JOHN PHAIR, OF OMAKERE, WAIPAWA, NEW ZEALAND.

DRAFT COUPLING FOR PLOWS AND THE LIKE.

Application filed December 28, 1920. Serial No. 433,676.

*To all whom it may concern*

Be it known that I, WILLIAM JOHN PHAIR, a citizen of the Dominion of New Zealand, and residing at Omakere, Waipawa, in the Provincial District of Hawke's Bay, declare that I have invented certain new and useful Improvements in Draft Couplings for Plows and the like, of which the following is a specification.

This invention relates to couplings used between plows or other implements and the tractor, or the swingletree of the team of horses employed to draw same.

The object of the invention is to provide for the aforesaid purpose, an improved coupling whereby damage to the implement or equipment caused through sudden jolts occasioned by the implement striking stumps and other obstructions is prevented.

According to the invention the improved coupling comprises a member formed by a pair of bars having at one end a loop or shackle and at the other end a pivoted hook the point or end of which engages below a spring pressed lever.

The hook is connected to the tractor or the swingletree of the team and the shackle or loop to the implement the spring pressed lever being set so as to engage the end of the hook and keep the latter from opening while only the normal pulling strain is exerted thereon.

Immediately however the draft exceeds normal as for instance when the implement strikes a stump the end of the hook becomes disengaged from below the spring pressed lever, whereupon the hook opens and the tractor or swingletree at once becomes disconnected from the implement.

The invention will be further described with reference to the accompanying drawing in which:—

Figure 1 is a side view and

Figure 2 is a plan view of the improved coupling while

Figure 3 is an inverted plan thereof.

The coupling comprises a member formed by a pair of bars 2 folded together and a rod 3 supported above said member and passing at one end through an upwardly extending bracket 4 fixed between the rear ends of the bars.

The rod 3 is provided at its forward end with a fork 5 which is pivoted to the upper end of the curved forward portion 6ª of a short lever 6 pivoted between the bars 2 midway of their ends.

The rod 3 is screw threaded to take nuts 7 and 8 the nut 7 being located outside the bracket 4 and the nuts 8 next the fork 5. Washers 9 with sleeves 10 thereon are also mounted on the rod 3 and on the latter between the washers 9 a compression spring 11 is provided.

By turning the nuts 8, the spring 11 can be adjusted to the required strength on the rod 3.

The hook 12 pivoted at 13 between the forward ends of the bars 2 curves upwards and rearwards and then downwards and terminates in a rounded end 14 which engages below the curved forward portion 6ª of the lever 6.

The other end of the bars 2, or that end of the member formed by the bars, carrying the bracket 4, has a shackle or loop 15 attached thereto.

Markings or graduations 16 of any approved scale are provided on one of the bars 2 to serve as a guide or indicator when adjusting the spring 11.

The shackle or loop 15 is connected to the plow or other implement and the hook 12 to the tractor or the swingle tree of a team of horses.

On the implement striking an obstruction during the course of its work, the extra strain put on the hook 12 causes the end 14 thereof to force the curved forward portion 6ª of the pivoted lever 6 upwards and backwards.

The movement of the lever 6 is controlled by the compression spring 11, and on the draft or pulling strain overcoming the resistance of the latter the end 14 of the hook forces the portion 6ª of the lever 6 out of its way and the hook 12 swings upwards and forwards and allows the coupling to become diconnected from the tractor or the swingle tree of the team.

What I do claim and desire to obtain by Letters Patent of the United States is:—

1. A coupling for the purpose set forth comprising a member formed by a pair of bars bolted together; a shackle at one end of said member; a rearwardly extending hook pivoted at its forward extremity between the ends of said bars, and capable of making a full turn on its pivot; a centrally pivoted lever mounted midway between said bars beneath which the free extremity of the hook is engaged when in the set position; a bracket on the other end of said member; a rod passing through the bracket and connected to the end of said lever; and a compression spring between the bracket and the end of the lever.

2. A coupling for the purpose set forth comprising a member formed by a pair of bars bolted together; a shackle at one end of said member; a rearwardly and downwardly curved hook pivoted at its forward extremity between the ends of said bars, and capable of making a full turn on its pivot; a lever with an upstanding extending portion, pivoted midway on said member to swing in the plane of the hook and beneath which lever the free extremity of said hook is engaged when in said position; a bracket on the shackle end of said member; a rod supported at one end by the bracket and connected at the other end by a forked fitting to the upwardly extending portion of said lever; and a compression spring surrounding said rod, between the supporting bracket and the fitting.

3. A coupling for the purpose set forth comprising a member formed by a pair of bars bolted together; a shackle pivoted to one end of said pair of bars; a rearwardly and downwardly curved hook pivoted in the opposite end of said pair of bars; a lever with an upwardly curved portion pivoted midway between the ends of said pair of bars, and engaging over the free end of the hook; a rod with nuts thereon supported at one end by a bracket fixed on said bars and connected by a forked fitting to the upwardly extending portion of said lever; and a compression spring on said rod, between the fixed bracket and nuts.

In testimony whereof I have signed my name to this specification in the presence of two witnesses.

WILLIAM JOHN PHAIR.

Witnesses:
DAVID CONNELL,
ERNEST WILFRED BOYCE CAREY.